United States Patent
Levy et al.

(10) Patent No.: US 9,807,121 B1
(45) Date of Patent: Oct. 31, 2017

(54) APPARATUS AND METHOD FOR DECRYPTION OF SECURE COMMUNICATION SESSIONS

(71) Applicant: Symantec Corporation, Mountain View, CA (US)

(72) Inventors: Joseph H. Levy, Eagle Mountain, UT (US); David Wells, Cambridgeshire (GB); Paul Kraus, Park City, UT (US)

(73) Assignee: Symantec Corporation, Mountain View, CA (US)

( * ) Notice: Subject to any disclaimer, the term of this patent is extended or adjusted under 35 U.S.C. 154(b) by 143 days.

(21) Appl. No.: 14/553,939

(22) Filed: Nov. 25, 2014

(51) Int. Cl.
H04L 29/06 (2006.01)

(52) U.S. Cl.
CPC ........ *H04L 63/205* (2013.01); *H04L 63/0272* (2013.01); *H04L 63/062* (2013.01); *H04L 63/166* (2013.01)

(58) Field of Classification Search
USPC ........................................................ 713/151
See application file for complete search history.

(56) References Cited

U.S. PATENT DOCUMENTS

| | | | | |
|---|---|---|---|---|
| 8,219,724 B1* | 7/2012 | Caruso | ................. | G06F 3/0604 710/36 |
| 8,543,726 B1* | 9/2013 | Kann | .................. | H04L 63/0281 709/219 |
| 2003/0131259 A1* | 7/2003 | Barton | ................ | H04L 63/0281 726/12 |
| 2005/0182958 A1* | 8/2005 | Pham | ..................... | G06F 21/51 726/22 |
| 2006/0088167 A1* | 4/2006 | Bade | ....................... | G06F 21/57 380/281 |
| 2010/0217837 A1* | 8/2010 | Ansari | ................... | G06Q 30/04 709/218 |
| 2010/0306528 A1* | 12/2010 | Andress | .............. | H04L 63/0281 713/153 |
| 2011/0197280 A1* | 8/2011 | Young | ................... | G06F 21/552 726/24 |
| 2013/0326233 A1* | 12/2013 | Tolfmans | .............. | H04L 9/0894 713/189 |

* cited by examiner

*Primary Examiner* — William Goodchild
(74) *Attorney, Agent, or Firm* — Maschoff Brennan

(57) ABSTRACT

An apparatus includes a processor and a memory storing instructions executed by the processor to receive a first communication session using a first key, where the first communication session is between a client and a server. A second communication session is initiated using a second key, where the second communication session is between the apparatus and the server. An active communication session is negotiated between the client and the server using the first key and the second key. The active communication session is decrypted using the first key and the second key. The active communication session is re-encrypted using a third key to form re-encrypted data.

15 Claims, 3 Drawing Sheets

“APPARATUS AND METHOD FOR DECRYPTION OF SECURE COMMUNICATION SESSIONS

FIELD OF THE INVENTION

This invention relates generally to communications in computer networks. More particularly, this invention relates to techniques for decryption of secure communication sessions.

BACKGROUND OF THE INVENTION

Secure communication sessions across a network are known. For example, Secure Socket Layer (SSL) techniques and Transport Layer Security (TLS) techniques are known. The network may be the Internet, Intranets, and other forms of both public and private networks. While secure communications provide security in the forms of confidentiality, integrity, and authentication, it also has the effect of obscuring the native (i.e., non-encrypted) content from inspection by other devices on a network intended to provide security services, such as a Next-Gen Firewall (NGFW), Deep Packet Inspection (DPI) engine, Intrusion Prevention System (IPS), advanced threat/malware analysis engine, full packet capture, or any other form of security analytics.

To address this inhibitive side-effect, a number of solutions have become available to perform various types of decryption of secure communication traffic for the purpose of restoring visibility. Some of these implementations are designed to perform the decryption and inspection within a single physical or virtual machine, allowing for the decrypted traffic to remain within the cryptographic boundary of the machine/appliance. Other implementations may involve multiple security devices working together in a physically secure environment and connected by direct interfaces. While this protects against exposure of the decrypted traffic to relatively trivial eavesdropping/tampering attempts enabled by the physical traversal across a network, it precludes the availability of the decrypted traffic for inspection, collection, consumption, or other kinds of use by external security platforms that are not directly connected.

To enable the availability of decrypted traffic for general external inspection, collection, and the like, a class of SSL decryption solution or "visibility appliance" was invented, which allows for the sharing of forms of the decrypted traffic via one or more methods. Known implementations employ emission of the decrypted content in the form of reconstituted TCP sessions via physical or virtual network interfaces, but other methods of sharing might include non-sessionized datagrams containing content payloads, or access to shared memory or storage. While this solution allows for shared access, it creates security risks while the decrypted data is in motion across a network, or while it is at rest in any kind of persistent repository, such as a full packet capture or security analytics platform.

FIG. 1 illustrates a prior art system. The system includes a client and a directly connected visibility appliance 102. The visibility appliance 102 is connected to a network 106, which may be any combination of wired and/or wireless networks. The network 106 provides connectivity to a server 110. The visibility appliance 102 is also connected to a security appliance 108 (either directly, through network 106 or through some other network).

The client 100 initiates a first session with a first key 112. The visibility appliance 102 intercepts the first session 114 and initiates its own SSL session (as a client) to the server 110. That is, it initiates a second session with a second key 116. The second key is negotiated between the visibility appliance 102 and the server 110. The visibility appliance 102 then completes the session with the client 100 using the first key.

Having access to both the client-side and server-side session keys, the visibility appliance 102 is then able to send the combined decrypted data to the external security appliance 108, as well as, optionally, any/all non-SSL traffic that it might be bridging. That is, the visibility appliance 102 decrypts the session and routes it 120 to the security appliance 108, which stores the decrypted data 122.

In another implementation, the visibility appliance 102 can behave as a transparent proxy. The visibility appliance 102 detects the session initiation and allows the client 100 and server 110 to negotiate the session details. The visibility appliance 102 only intervenes in the SSL Handshake in order to manipulate the SSL server certificate and to participate in the negotiation of the session keys. The choice of cipher suite and key sizes used is between the client 100 and server 110 and will always be the same for the first session and the second session.

In situations where the security appliance 108 provides some kind of persistent store of the decrypted data (e.g., a full packet capture or security analytics platform), there is a data-at-rest problem of transparency. It is worth noting that techniques such as encrypted volumes or full disk encryption (FDE) only partially address the problem because the data, unless otherwise transformed by the security appliance 108 itself, remains accessible to anyone with access to the operating system or application that provides access to the data, thus potentially exposing Personally Identifiable Information (PII), Private Health Information (PHI) or other types of confidential or private information.

In view of the foregoing, techniques are needed for on-demand decryption of secure communication sessions.

SUMMARY OF THE INVENTION

An apparatus includes a processor and a memory storing instructions executed by the processor to receive a first communication session using a first key, where the first communication session is between a client and a server. A second communication session is initiated using a second key, where the second communication session is between the apparatus and the server. An active communication session is negotiated between the client and the server using the first key and the second key. The active communication session is decrypted using the first key and the second key. The active communication session is re-encrypted using a third key to form re-encrypted data.

A system includes a first machine with a processor and a memory storing instructions executed by the processor to receive a first communication session using a first key, where the first communication session is between a client and a server. A second communication session is initiated using a second key, where the second communication session is between the apparatus and the server. An active communication session is negotiated between the client and the server using the first key and the second key. The active communication session is decrypted using the first key and the second key to form decrypted data. The decrypted data is conveyed to a trusted link. A second machine is attached to the trusted link. The second machine has a processor and a memory storing instructions executed by the processor to re-encrypt the decrypted data with a third key to form re-encrypted data. The re-encrypted data is stored.

A method includes receiving at a machine a first communication session using a first key, where the first communication session is between a client and a server. A second communication session is initiated using a second key, where the second communication session is between the machine and the server. The machine negotiates an active communication session between the client and the server using the first key and the second key. The machine decrypts the active communication session using the first key and the second key. The machine re-encrypts the active communication session using a third key to form re-encrypted data.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
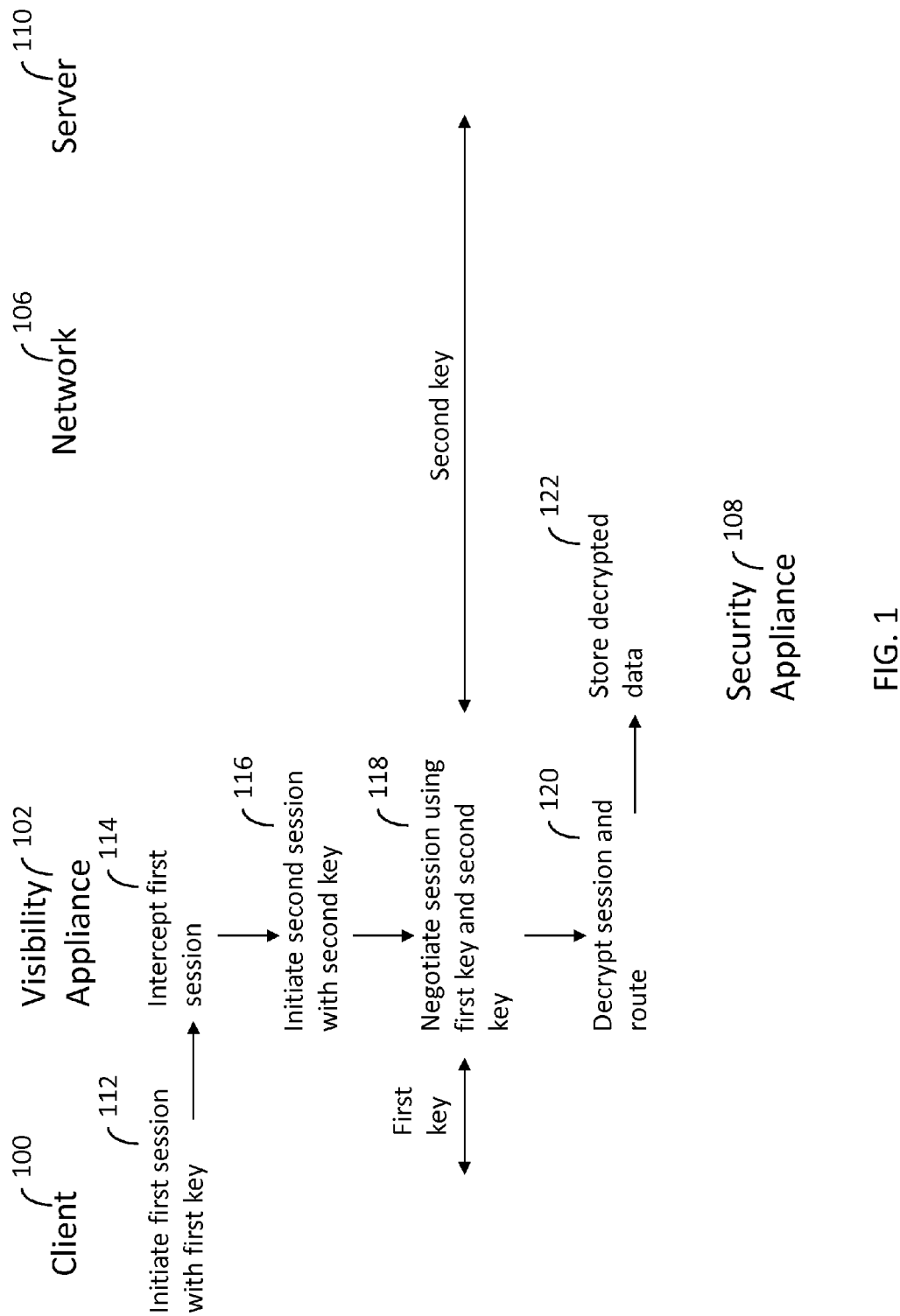
FIG. 1 illustrates operations performed in a prior art system.
Figure 2:
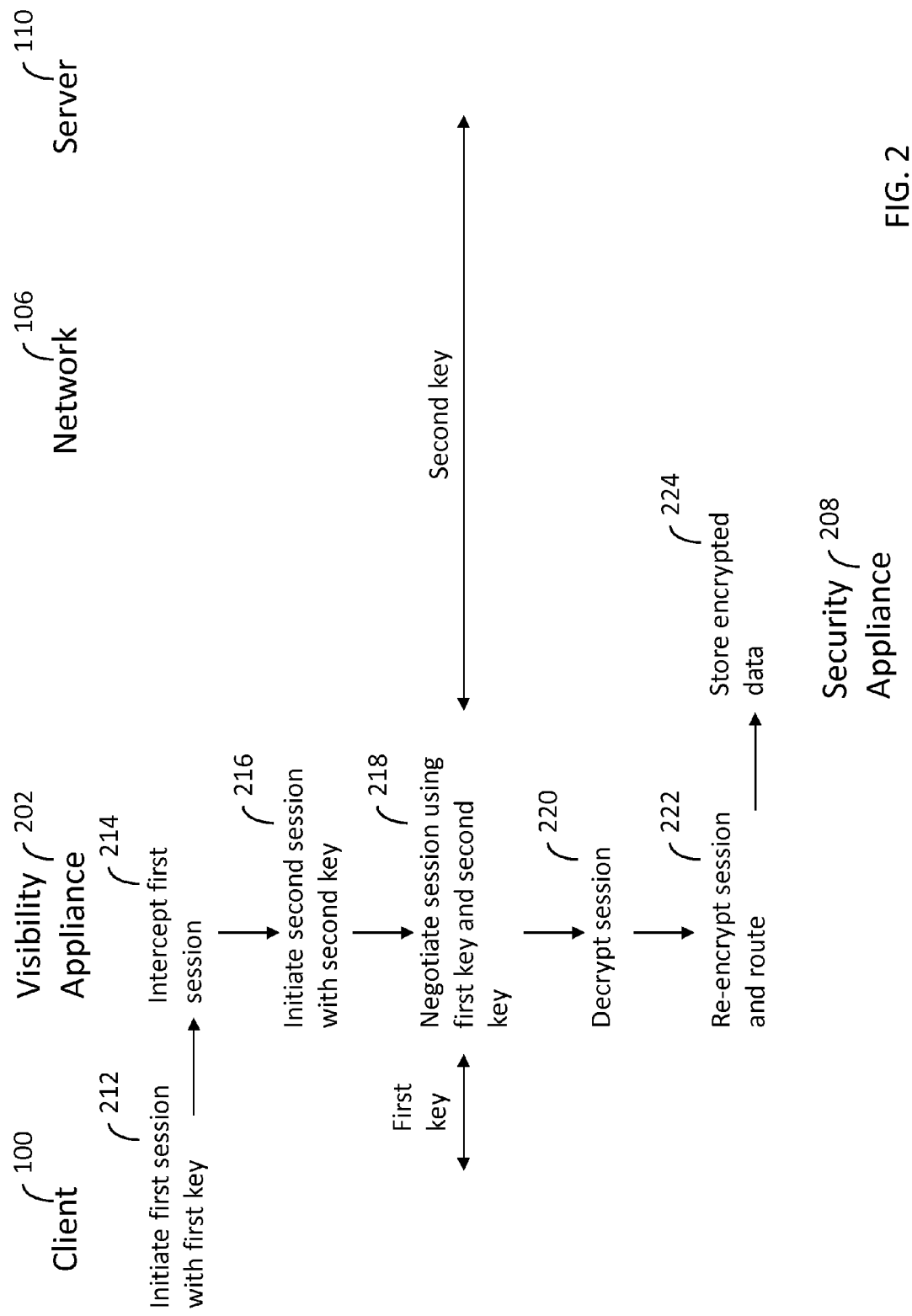
FIG. 2 illustrates operations performed in a system configured in accordance with an embodiment of the invention.

FIG. 2 illustrates a system with a client 100, visibility appliance 202, network 106, security appliance 208 and server 110. The processing operations 212-218 correspond to the processing operations 112-118 of FIG. 1. However, the visibility appliance 202 decrypts a session 220 and then proceeds to re-encrypt the session and route it 222. The security appliance 208 then stores encrypted data 224.

Figure 3:
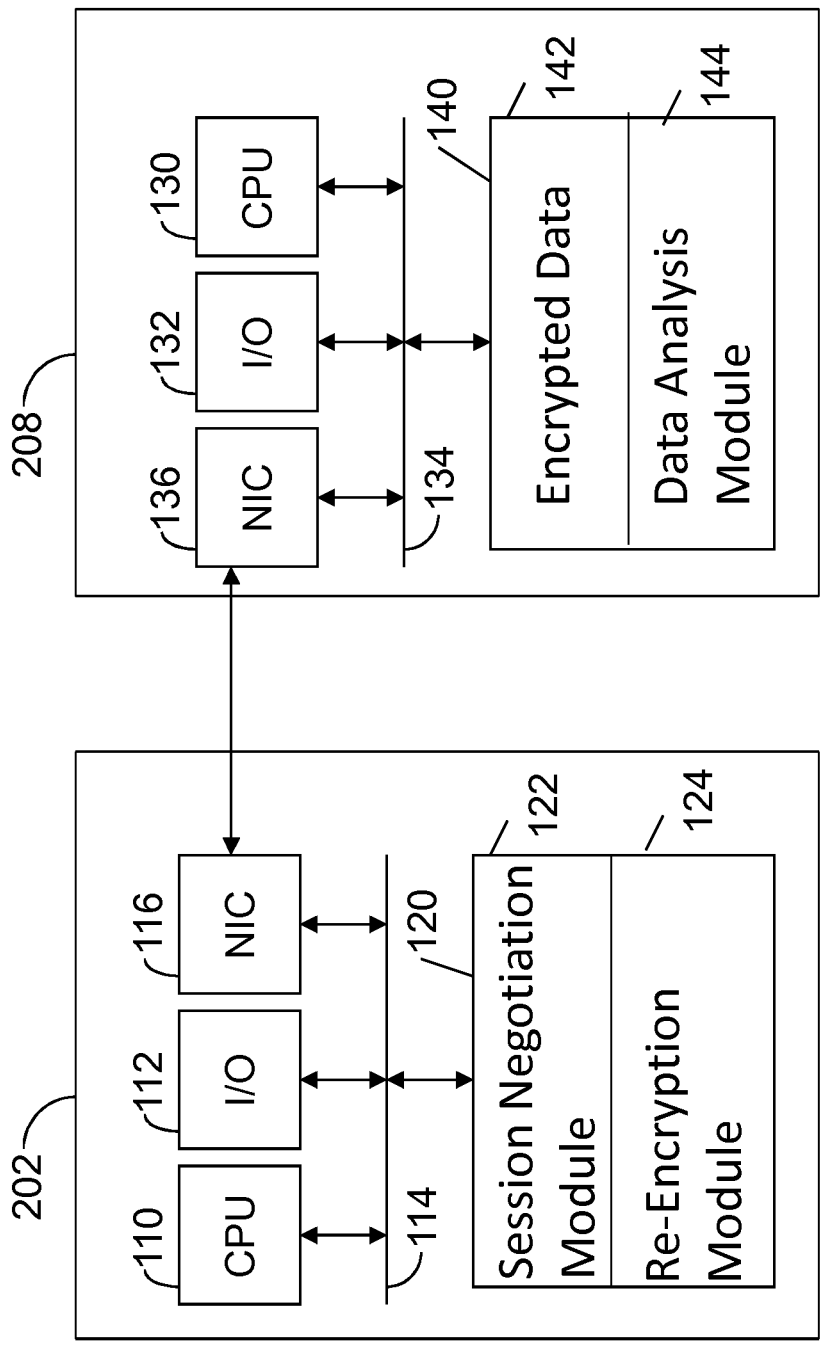
FIG. 3 illustrates a visibility appliance and security appliance utilized in accordance with an embodiment of the invention.

FIG. 3 illustrates an embodiment of the visibility appliance 202 and the security appliance 208. The visibility appliance 202 may include standard components, such as a central processing unit 110 and input/output devices 112 connected via a bus 114. If configured as an appliance, a limited interface is supplied and the input/output devices may comprise various communication ports. If configured as a server, the input/output devices 112 may include a keyboard, mouse, display and the like. A network interface circuit 116 may also be connected to bus 114. The network interface circuit 116 may provide connectivity to a network (e.g., network 106 or some other network). Alternately, a direct and secure communication pathway may be formed between the visibility appliance 202 and security appliance 208 (e.g., through a cable connection between a port of visibility appliance 202 and a port of security appliance 208). A memory is also connected to the bus 114. The memory may store a session negotiation module 122, which includes executable instructions to implement the operations 214-218 of FIG. 2. The memory may also store a re-encryption module 124, which includes executable instructions to implement the operations 220-222 of FIG. 2 (and similar operations discussed below).

The security appliance 208 also includes standard components, such as a central processing unit 130 and input/output devices 134 connected via a bus 134. A network interface circuit 136 is also connected to the bus 134. A memory 140 is also connected to the bus 134. The memory 140 stores encrypted data 142. The memory 140 also stores a data analysis module 144, which includes executable instructions to perform data analysis of the type described herein.

In one embodiment, the visibility appliance 202 may send the security appliance 208 a re-encrypted version of the decrypted data, using a new session key (Session Key 3). This ensures that the data is encrypted in transit, as well as at rest, in the event that the security appliance 208 is saving the data to persistent storage.

For the purpose of subsequent, on-demand decryption of the data, Session Key 3 can be conveyed to the security appliance 208 in a variety of ways: a) via a dedicated and secure management path employing some level of application or transport security, b) as encoded/encrypted metadata embedded within the flow between the visibility appliance 202 and the security appliance 208 (referred to herein as "crypto flow"), c) maintained in a secure Hardware Security Module (HSM) or database within the visibility appliance 202 itself providing a binding between the crypto flow and its session key, d) using an SSL session as the means to establish and exchange a session key for the crypto flow, e) securely conveyed to and stored in some other HSM or database providing a similar binding. Given such methods of conveying and preserving the session key, it is then possible to subsequently decrypt the session.

This method of known-session-key, on-demand decryption can be further secured by encrypting the session key itself, as well as by requiring any number of strong authentication mechanisms to access and/or decrypt the session key, including but not limited to multiple-party authorization, multiple-factor authentication and role-based access control. If SSL is used to establish and exchange a session key for the flow then many of these authentication mechanisms would happen as part of the SSL handshake.

This embodiment also allows for the security appliance 208 to perform real or non-real time decryption of the session using the securely conveyed session key for the purposes of performing a set of security functions on the decrypted data while helping to preserve data-in-motion security. In addition to per flow mechanisms that protect the data in motion other point to point techniques, such as MACSec could be used between the visibility appliance 202 and security appliance 208.

In another embodiment, the visibility appliance 202 may send the decrypted data to the security appliance 208 via a trusted connection, such as a known-secured physical network path or a VPN connection, which reasonably protects the data-in-motion. For the purposes of preserving data-at-rest, the security appliance 208 may be instructed to only perform certain non-persistent security functions on the decrypted data, such as metadata analysis or other forms of real-time, ephemeral analytics. Such instruction may be administratively configured in advance, or via explicit instruction for a given flow or set of flows from the visibility appliance 202. The security appliance 202 may then perform the necessary set of inspection or analytics services on the decrypted data, while honoring the instruction to selectively not preserve the data, thus providing another form of solution to the data-at-rest problem.

For the purposes of forensic or retrospective investigations, the visibility appliance 202 may also send one or more forms of the SSL session (client session, server session, or both) which the security appliance 208 may then associate with the metadata derived from the ephemeral decrypted data through IP/Port correlation, or through some other flow-binding information that can be sent either through the control channel or as embedded metadata within either the decrypted or SSL data flows themselves. This may be done in place of, or in addition to other methods of delivery of the native SSL session to the security appliance, e.g. via a SPAN, tap, frame encapsulation, or other method of packet delivery.

In another embodiment, the visibility appliance 202 may send the decrypted data to the security appliance 208 via a trusted connection, such as a known-secured physical network path or a VPN connection, reasonably ensuring protection of the data-in-motion. For the purposes of preserving data-at-rest, the security appliance 208 may be instructed to perform a set of security/analysis functions on the data and to then re-encrypt the data with a new session key prior to preserving it in a persistent data repository. Such instruction may be administratively configured in advance, or via explicit instruction for a given flow or set of flows from the visibility appliance 202. The security appliance 208 may then perform the necessary set of inspection or analytics services on the decrypted data, while honoring the instruction to selectively re-encrypt data with a session key that it may securely store in some internal or external HSM or database for future retrieval and use protected by some strong-authentication method, as previously described. If the visibility appliance 202 provided the session key used to decrypt the original SSL session then this could be used by the security appliance 208 to re-encrypt any data that it wishes to store in encrypted form. Using the session key provided by visibility appliance 202 means that the same key could be used to decrypt the original encrypted flow if this has been captured as well as any re-encrypted data from the flow saved by the security appliance 208.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a processor; and
a memory storing instructions that, when executed by the processor, are configured to:
receive, over a network, a first communication session using a first key, wherein the first communication session is between a client and a server,
initiate a second communication session using a second key, wherein the second communication session is between the apparatus and the server,
negotiate an active communication session between the client and the server using the first key and the second key,
decrypt the active communication session using the first key and the second key,
re-encrypt the active communication session using a third key to form re-encrypted data,
route the re-encrypted data to a security appliance external to the network, wherein the security appliance is configured to store the re-encrypted data, and
route the third key to the security appliance along with multiple-party authorization authentication credentials.

2. The apparatus of claim 1 wherein the instructions configured to route the third key include instructions configured to route the third key via a dedicated management path.

3. The apparatus of claim 1 wherein the instructions configured to route the third key include instructions configured to route the third key via encoded metadata.

4. The apparatus of claim 1 wherein the instructions configured to route the third key include instructions configured to route the third key via a hardware security module.

5. The apparatus of claim 1 wherein the instructions configured to route the third key include instructions configured to route the third key via a secure socket layer session.

6. A method, comprising:
receiving, at a machine, a first communication session using a first key, wherein the first communication session is between a client and a server over a network,
initiating, at the machine, a second communication session using a second key, wherein the second communication session is between the machine and the server,
negotiating, via the machine, an active communication session between the client and the server using the first key and the second key,
decrypting, at the machine, the active communication session using the first key and the second key,
re-encrypting, at the machine, the active communication session using a third key to form re-encrypted data,
routing, via the machine, the re-encrypted data to a security appliance external to the network, wherein the security appliance is configured to store the re-encrypted data, and
routing, via the machine, the third key to the security appliance along with multiple-factor authentication credentials.

7. The method of claim 6 wherein the routing of the third key includes routing the third key via a dedicated management path.

8. The method of claim 6 wherein the routing of the third key includes routing the third key via encoded metadata.

9. The method of claim 6 wherein the routing of the third key includes routing the third key via a hardware security module.

10. The method of claim 6 wherein the routing of the third key includes routing the third key via a secure socket layer session.

11. One or more computer-readable non-transitory storage media storing instructions thereon that, when executed by one or more processors, are configured to:
receive, at an apparatus over a network, a first communication session using a first key, wherein the first communication session is between a client and a server;
initiate a second communication session using a second key, wherein the second communication session is between the apparatus and the server;
negotiate an active communication session between the client and the server using the first key and the second key;
decrypt the active communication session using the first key and the second key;
re-encrypt the active communication session using a third key to form re-encrypted data;
route the re-encrypted data to a security appliance external to the network, wherein the security appliance is configured to store the re-encrypted data; and
route the third key to the security appliance along with role-based access control authentication credentials.

12. The one or more computer-readable non-transitory storage media of claim 11 wherein the instructions configured to route the third key include instructions configured to route the third key via a dedicated management path.

13. The one or more computer-readable non-transitory storage media of claim 11 wherein the instructions configured to route the third key include instructions configured to route the third key via encoded metadata.

14. The one or more computer-readable non-transitory storage media of claim 11 wherein the instructions configured to route the third key include instructions configured to route the third key via a hardware security module.

15. The one or more computer-readable non-transitory storage media of claim 11 wherein the instructions configured to route the third key include instructions configured to route the third key via a secure socket layer session.

* * * * *